United States Patent
Oh et al.

(10) Patent No.: US 9,749,285 B2
(45) Date of Patent: Aug. 29, 2017

(54) CONNECTED HOME CONTROL SYSTEM WITH AUTO ROUTER PORT CONFIGURATION AND DDNS REGISTRATION

(71) Applicant: HONEYWELL INTERNATIONAL INC., Morristown, NJ (US)

(72) Inventors: Eric Oh, Syosset, NY (US); David S. Zakrewski, Babylon, NY (US); Kenneth L. Addy, Massapequa, NY (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 478 days.

(21) Appl. No.: 13/705,602

(22) Filed: Dec. 5, 2012

(65) Prior Publication Data
US 2013/0346630 A1    Dec. 26, 2013

Related U.S. Application Data

(60) Provisional application No. 61/568,271, filed on Dec. 8, 2011.

(51) Int. Cl.
    *G06F 15/16*     (2006.01)
    *H04L 29/12*     (2006.01)

(52) U.S. Cl.
    CPC ...... *H04L 61/2007* (2013.01); *H04L 61/2076* (2013.01); *H04L 61/1511* (2013.01)

(58) Field of Classification Search
    CPC .................................................. H04L 61/1511
    USPC ................................................ 709/203, 245
    See application file for complete search history.

(56) References Cited

U.S. PATENT DOCUMENTS

| | | | |
|---|---|---|---|
| 7,643,432 B2 | 1/2010 | Wu et al. | |
| 9,130,994 B1* | 9/2015 | Newstadt | H04L 67/18 |
| 2003/0065741 A1* | 4/2003 | Vo | H04L 69/16 |
| | | | 709/217 |
| 2005/0015505 A1* | 1/2005 | Kruis | H04L 41/0806 |
| | | | 709/229 |
| 2005/0044197 A1* | 2/2005 | Lai | G06Q 10/10 |
| | | | 709/223 |
| 2005/0105543 A1* | 5/2005 | Ikenaga | H04L 29/12367 |
| | | | 370/428 |
| 2007/0088815 A1 | 4/2007 | Ma et al. | |
| 2008/0016570 A1* | 1/2008 | Capalik | H04L 63/1408 |
| | | | 726/23 |
| 2008/0170569 A1* | 7/2008 | Garg | H04L 12/12 |
| | | | 370/390 |

(Continued)

FOREIGN PATENT DOCUMENTS

CN     1574754 A     2/2005

OTHER PUBLICATIONS

International Search Report for corresponding GB application GB1222055.4, dated Apr. 29, 2013.

(Continued)

*Primary Examiner* — Jason Recek
(74) *Attorney, Agent, or Firm* — Husch Blackwell LLP

(57) ABSTRACT

A network based product enables browser based computers, smart phones or tablets to connect to and access the product. A local router can be automatically configured by the product. The product can be automatically registered with a DDNS server and a user account opened. Authentication can be carried out between the product and the server.

16 Claims, 6 Drawing Sheets

(56) References Cited

U.S. PATENT DOCUMENTS

| | | | |
|---|---|---|---|
| 2009/0141692 A1 | 6/2009 | Kasslin et al. | |
| 2009/0207905 A1* | 8/2009 | Tomita | 375/240.01 |
| 2010/0014536 A1* | 1/2010 | Lin et al. | 370/410 |
| 2010/0115082 A1* | 5/2010 | Pirozzi | H04L 43/0817 |
| | | | 709/224 |
| 2010/0241696 A1* | 9/2010 | Matoba | H04L 67/14 |
| | | | 709/203 |
| 2010/0262681 A1 | 10/2010 | Chang et al. | |
| 2010/0332615 A1* | 12/2010 | Short | H04L 63/08 |
| | | | 709/217 |
| 2011/0277019 A1* | 11/2011 | Pritchard, Jr. | H04L 63/0815 |
| | | | 726/4 |
| 2012/0054348 A1* | 3/2012 | Rollgen | 709/227 |
| 2012/0173704 A1* | 7/2012 | Lingen | G06F 11/3006 |
| | | | 709/224 |
| 2012/0271925 A1* | 10/2012 | Miller | H04L 49/35 |
| | | | 709/220 |

OTHER PUBLICATIONS

Honeywell Tuxedo Touch Series Home Automation System's User Guide (Jul. 2011).
Honeywell Tuxedo Touch Adds Home Automation to Security Systems (Jun. 11, 2012).
First Office Action and Search report for corresponding CN patent application 201210596323.2, dated Nov. 28, 2016.
English-language translation of First Office Action and Search report for corresponding CN patent application 201210596323.2, dated Nov. 28, 2016.
English-language translation of Abstract for CN patent application 1574754 A, dated Feb. 2, 2005.

* cited by examiner

CONNECTED HOME CONTROL SYSTEM WITH AUTO ROUTER PORT CONFIGURATION AND DDNS REGISTRATION

CROSS-REFERENCE TO RELATED APPLICATION

This application claims the benefit of the filing date of U.S. Provisional Application Ser. No. 61/568,271 filed Dec. 8, 2011, entitled, "Connected Home Control System With Auto Router Port Configuration and DDNS Registration". The '271 application is hereby incorporated herein by reference.

FIELD

This application pertains to systems and methods of providing web based access to displaced monitoring control systems. More particularly, the application pertains to such systems and methods which substantially automatically adjusts the setting of a local router and registers with a DDNS server to provide remote connectivity to homes and buildings, which include such monitoring systems.

BACKGROUND

Regional monitoring systems are known which can provide information to a user via one or more computer networks as to a variety of conditions in a home, commercial or industrial building. Such systems are commercially available from representatives of the assignee hereof, Honeywell International Inc., under the brand name of TUXEDO home automation systems. A plurality of lights, thermostats, door locks, cameras, sensors, or detectors can be monitored by a system control unit with a touch screen keyboard. Such systems can be Internet enabled so that users can access their system remotely.

There is a significant and growing consumer demand for remote connectivity into homes and buildings via smartphones and tablets to remotely control such systems. These can include intrusion, automation control, access, video, HVAC, energy management, home healthcare systems without limitation. Existing remote service concepts are primarily centralized cloud based services, virtual private networks (VPN) or dynamic domain name service (DDNS).

DDNS type of services have received less interest in past due to requirements for complex router configurations and DDNS registration. FIG. 4A illustrates a known manual process where a user configures the router.

DDNS however is a very low cost and low maintenance solution. It would be desirable to provide versions of DDNS types of services that are easier to use than are known configurations.

DETAILED DESCRIPTION

Figure 1:
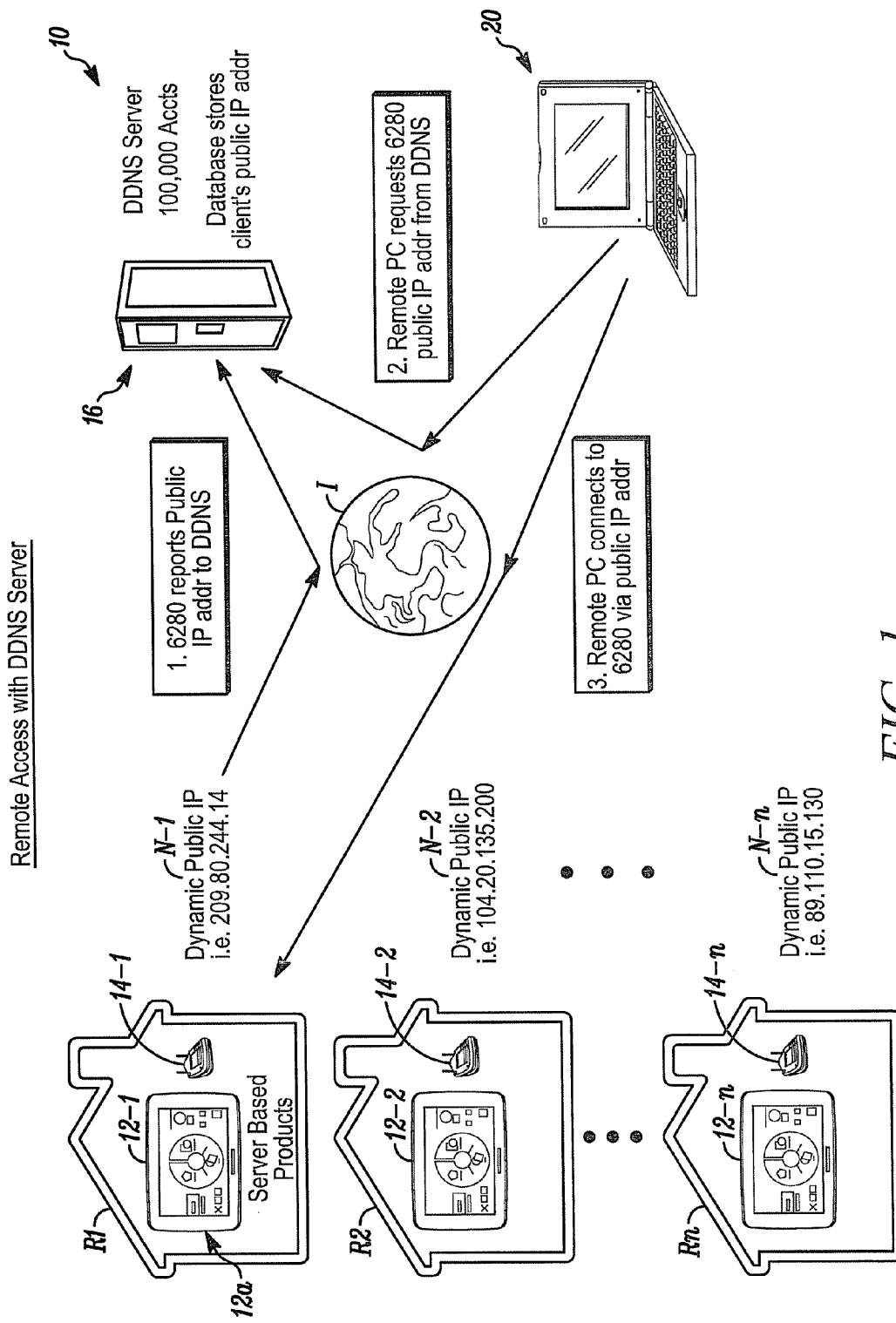
FIG. 1 illustrates an overall view of a system in accordance herewith.

While disclosed embodiments can take many different forms, specific embodiments thereof are shown in the drawings and will be described herein in detail with the understanding that the present disclosure is to be considered as an exemplification of the principles thereof as well as the best mode of practicing same, and is not intended to limit the application or claims to the specific embodiment illustrated.

Embodiments hereof are based on products with built-in web servers to provide low cost and low maintenance remote connectivity via DDNS services. Unlike conventional IP camera remote DDNS solutions, embodiments hereof solve the two most difficult setup areas for an installer or home owner, to open an unused port in a local router and registering with a DDNS service. Two problematic configuration requirements are addressed in a user friendly "auto remote access account creation" process implemented between a web enabled product and a server. This process advantageously requires little or no user intervention.

Intelligent IP network based products, such as Honeywell's TUXEDO brand home controllers with built-in web servers can communicate with browser based PC's, smartphones and tablets to connect and access such products via html or app based user interfaces. In one aspect, controller products, such as TUXEDO brand products, can incorporate universal plug and play (UPNP) auto router configuration technology to easily connect to a router and determine the router's firewall and port settings. It will then set the proper settings in the router and the product can be remotely accessed.

In another aspect, a self-contained DDNS server can be provided that automatically accepts trusted controller products, such as TUXEDO brand products, and creates user accounts for the customers who have purchased the products. The TUXEDO brand products and the self-contained DDNS server both can incorporate matching authentication techniques to connect to each other and exchange data to automatically create remote access accounts.

With respect to the figures, FIG. 1 illustrates a configuration 10 wherein a plurality of buildings, such as residences R1, R2 . . . Rn include web enabled monitoring systems, 12-1, implemented as Honeywell 6280-type TUXEDO brand products each with an interactive operator interface, such as indicated at 12a. Associated with each of the products, 12-1 is a local router, 14-1, 14-2 . . . 14-n to implement bidirectional communications via a plurality of networks, N-1, N-2 . . . N-n via the internet I with a DDNS server 16 and an interrogating device such as a PC, smart phone or tablet 20 all without limitation. It will be understood that reference to the Honeywell 6280-type Tuxedo server based products, noted herein is exemplary only. Other types of network, Internet enabled or server based products come within the spirit and scope hereof.

The product 12-1, in accordance herewith, has reported its Public IP address to server 16, along with an associated domain name, as at "1". The server 16 stores the domain name and the IP address for later use.

Subsequently, a user wishing to transmit a request, to interrogate or forward commands to the server based products, such as 12-1, can transmit a domain name via a browser. The server 16 can look up the IP address, and forward it for execution to the appropriate addressee via a network, such as N-1. The device 20 can then communicate with the product 12-1. Server 16 can thus maintain a current record of domain names and corresponding IP addresses, as new products are added, or moved to different locations, having different IP addresses.

Figure 2:
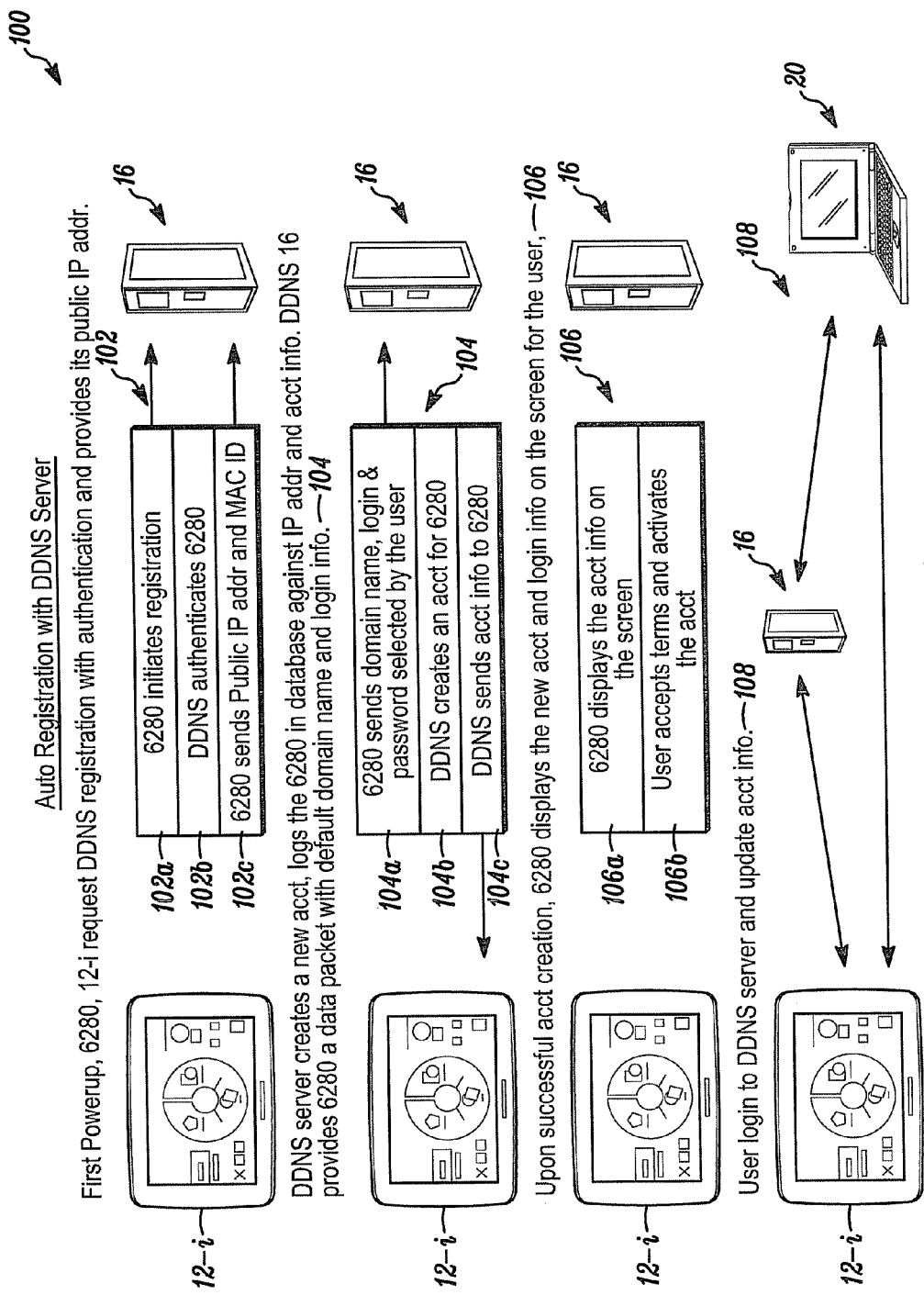
FIG. 2 illustrates aspects of a DDNS registration process.

FIG. 2 illustrates a process 100 of automatically registering a server based product, such as 12-*i* with DDNS server 16. As at 102*a*, on first powerup the product 12-*i* initiates the registration sequence by communicating via local router 14-I (not shown) and the internet I (not shown), with the server 16. The product 12-*i* and the server 16 automatically engage in an authentication process, as at 102*b*.

If the authentication process is successful, the product 12-*i* forwards its IP address, and hardware address, MAC ID, to server 16. In response, subsequently, as at 102*d*, the server 16 creates a new user account, logs the product 12-*i* into its database along with the IP address and account information. Then server 16 returns to the product 12-*i* a default domain name, associated with the IP address and login information.

With reference to 104*a*, the product 12-*i* forwards to the server 16 a domain name, login and user password, selected by the user via a keyboard or touchscreen capability in the product 12-*i*. The server 16 creates the account for the user, as at 104*b* and as at 104*c* forwards the account information to the product 12-*i* as at 104*c*.

Upon successful account creation the product 12-*i* displays the account information on its screen 12*a* (not shown), as at 106*a*. The user can then accept the terms and conditions to activate the account as at 106*b*. Subsequently, as at 108 the user can long into the server 16 and update the account information.

Figure 3:
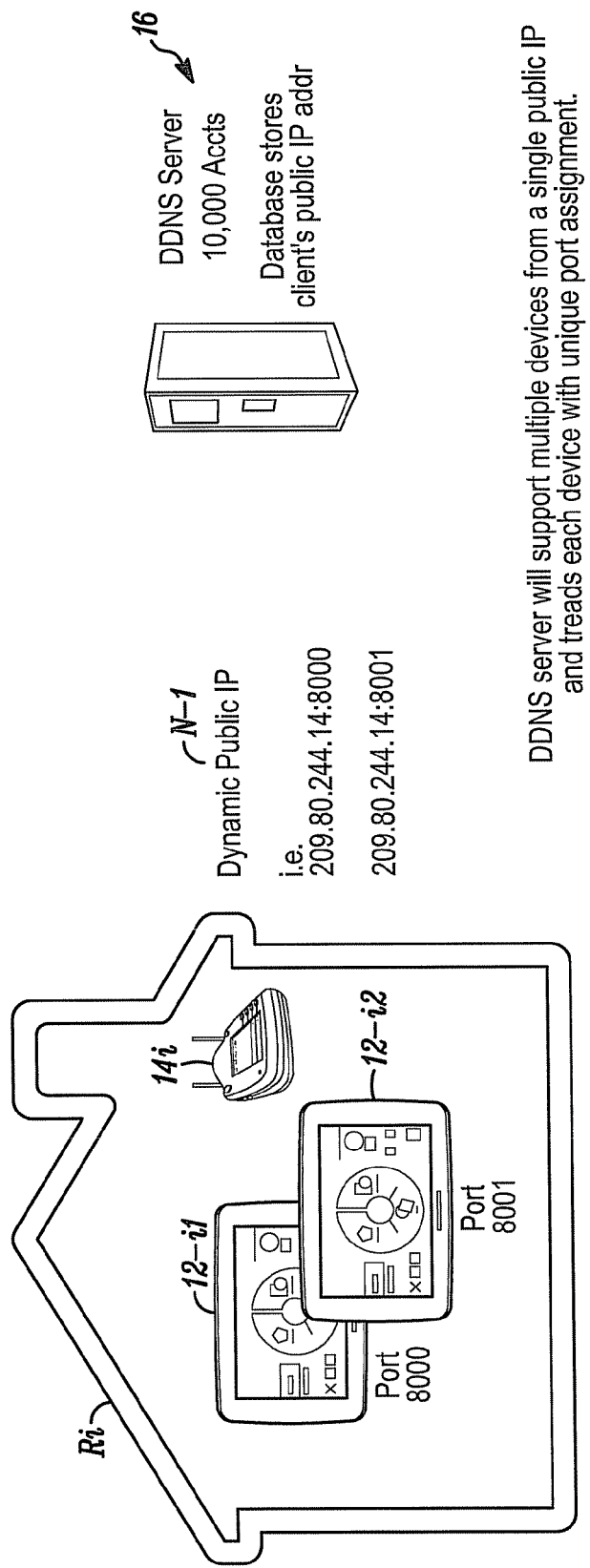
FIG. 3 illustrates aspects of multi-port router assignments.

As a further advantage of the present embodiment, as illustrated in FIG. 3 a second product, 12-*i*2 can be supported via a variation of the dynamic IP address with a common domain name. Unique port assignments can be implemented via the router 14*i*.

Figure 4A:
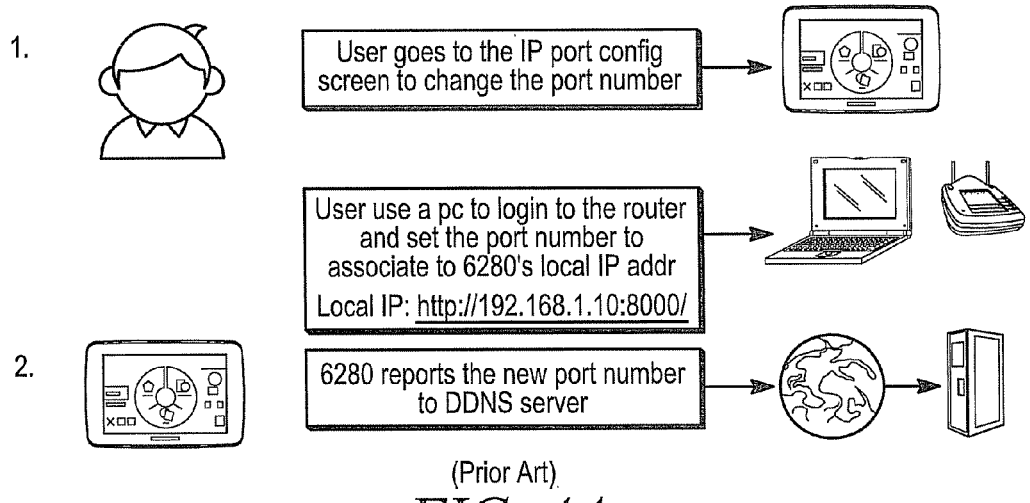
FIG. 4A illustrates a prior art process of manual, router port assignment.
Figure 4B:
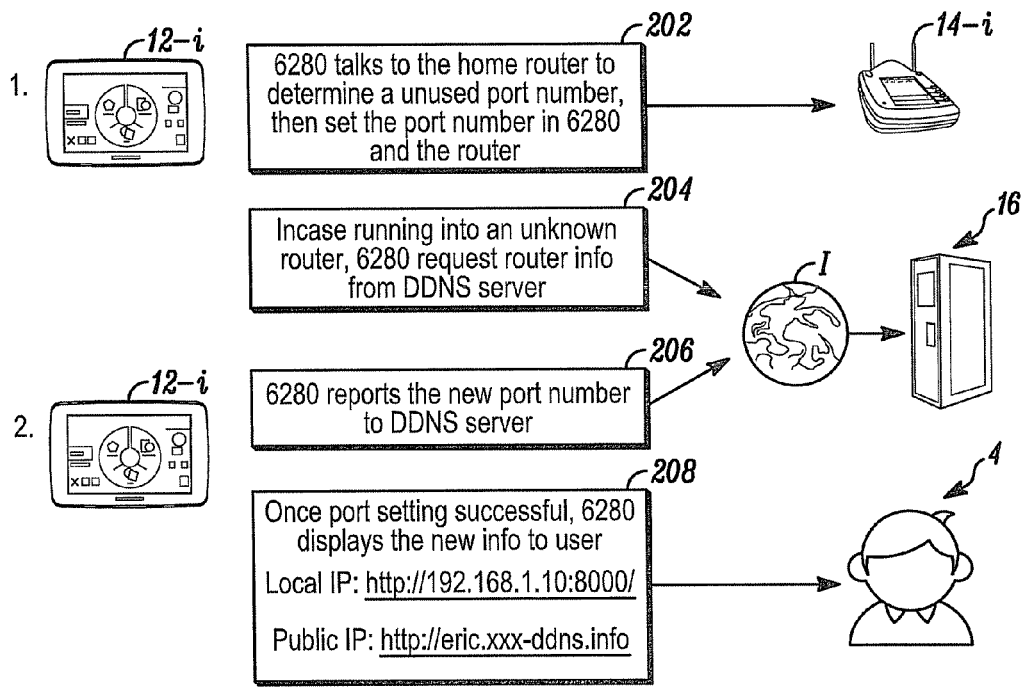
FIG. 4B illustrates aspects of a process of automatic router port assignment in accordance herewith.

FIG. 4B illustrates a process 200 of automatic adjustment of the local router 14-*i* by the product 12-*i*. The product 12-*i* communicates with the local router 14-*i*, as at 202 to establish an unused port number which can be set in both the product 12-*i* and the router 14-*i*. The product 12-*i* reports the new port number to the server 16, as at 206. Multiple products can be supported via multiple different ports, as in FIG. 3. In the event that the product 12-*i* encounters problems with the router 14-*i*, it can communicate with the server 16, as at 204. A successful port setting can be communicated to user U via the display 12*a* (not shown) of the product 12-*i* as 208.

Figure 5A:
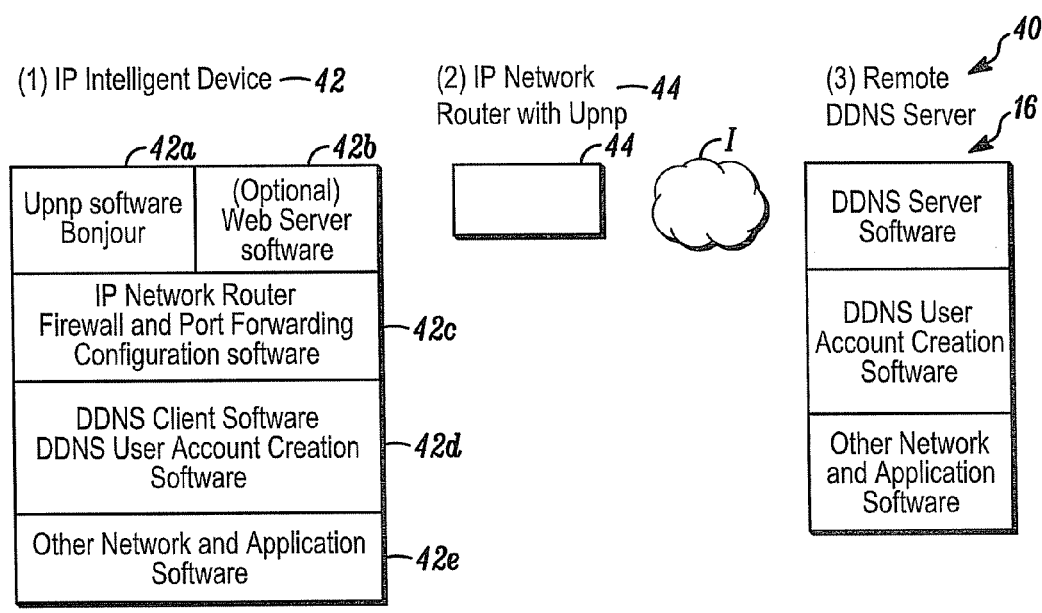
FIG. 5A illustrates a block diagram of a system in accordance herewith.

FIG. 5A illustrates a system 40 in accordance herewith. System 40 can implement a method which incorporates an IP intelligent device, such as 42, capable of using UPNP technology, implemented at least in part with executable instructions 42*a*, to automatically find and configure a network router 44 to open a port and automatically connect to a remote DDNS server, such as server 16, to create a user DDNS acct with an assigned URL. This account will enable the user to instantly access the device 42 and other devices associate with the account from anywhere in the world over the Internet or a cellular network.

System 40 includes, at least one IP intelligent device, such as 42, with UPNP or Bonjour plug-n-play software 42*a*, an optional built-in web server function 42*b*, plus IP network router port forwarding auto configuration software 42*c*, DDNS client software 42*d* capable of communicating with the DDNS server 16 to automatically create the user account.

System 40 also includes, at least one UPNP capable IP network router 44 with or without built-in modem and/or access point, and, at least one DDNS server, such as server 16 located at a remote location providing DDNS service. The server 16 could be provided with or without auto DDNS account creation capabilities.

System 40 can implement a method of establishing a user account and activating a URL for an associated external IP address. This method enables the device 42 to automatically detect, configure the router 44 and create a user DDNS account at the server 16 as follows: the IP intelligent device 42 uses UPNP functionality and software 42*a* to find the router 42 to which it is connected. The IP intelligent device 42 automatically negotiates with the router 44 for an unused port or gets a pre-assigned port from the administrator. The device 42 automatically requests that the router 44 open a port associated with the IP address of the device 42.

The device 42 subsequently receives confirmation from the router 44. The device 42 acquires the router's external IP address from the router 44 or from the Internet I.

The device 42 prepares a user account data packet (example: URL, user name, password, mac id, ip address port number, device number, acct number . . . ). The packet can then be sent to a predetermined DDNS sever, such as server 16, to request creation of a user account. The packet can, optionally, be encrypted and sent over a secure network.

The device 42 receives a reply from the DDNS server 16 indicating that the request for an account was or was not accepted. If accepted, the DDNS server 16 establishes the user account and activates a URL for the associated external IP address. Port number association and activation are optional. The IP intelligent device 42 then requests that the DDNS server 16 validate the newly created URL so that users can access the device 42 externally.

Figure 5B:
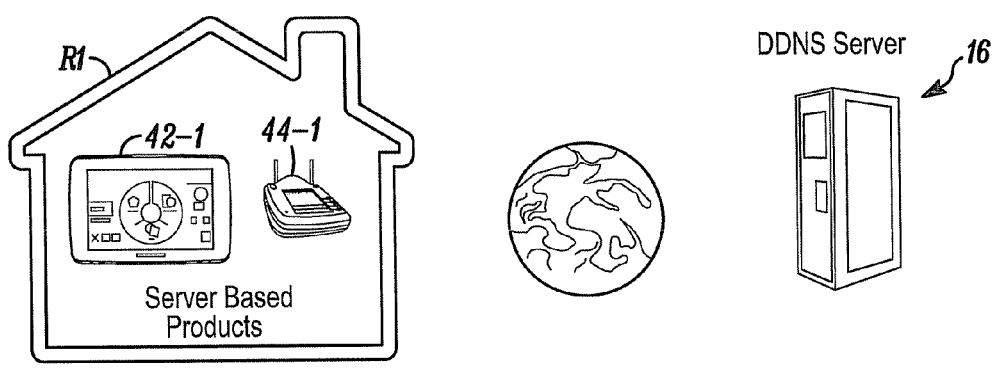
FIG. 5B illustrates another view of the system of FIG. 5A.

FIG. 5B illustrates a system such as device 42 and router 44 installed in a region R1 being monitored. As implemented, server based product 42-1 corresponds to the above discussed device 42. Router 44-1 corresponds to the above discussed router 44. As discussed above, per a user's request, router 44-1 can be set by the product 42-1, and communications with the server 16 can take place to establish a user's account and activate the associated URL.

Figure 6A:
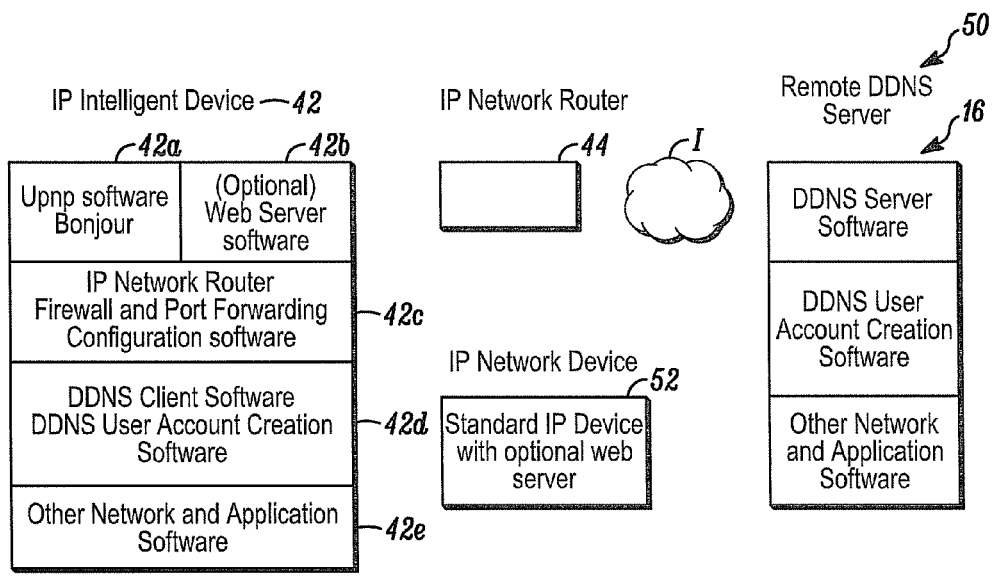
FIG. 6A illustrates another system in accordance herewith.

FIG. 6A illustrates a system 50 which includes IP intelligent device 42 capable of using UPNP technology, including software 42*a*, to automatically find other IP network devices, find and configure the network router 44 to open a port and automatically connect to the remote DDNS server 16 to add a new IP device to a new or existing DDNS user account. Elements of system 50 which correspond to previously discussed elements of system 40 have been assigned the same identification numerals as in FIG. 5A.

The system 50 in implementing the above noted method can include at least one IP intelligent device 42 with an optional built-in web server function, UPNP or Bonjour plug-n-play software 42*a*, IP network router port forwarding auto configuration software 42*c* plus DDNS client software 42*d* capable of communicating with the DDNS server 16 to create or update the user account automatically.

System 50 also includes, at least one standard IP device with optional built-in web server function 52, and, other functions such as IP camera, IP NAS drive, IP thermostat, IP energy meter, computers . . . and the like all without limitation. At least one UPNP capable IP network router 44 with or without built-in modem and/or access point can communicate at least with device 42. At least one DDNS server 16 at a remote location provides DDNS service with or without auto DDNS account creation capabilities.

Figure 6B:
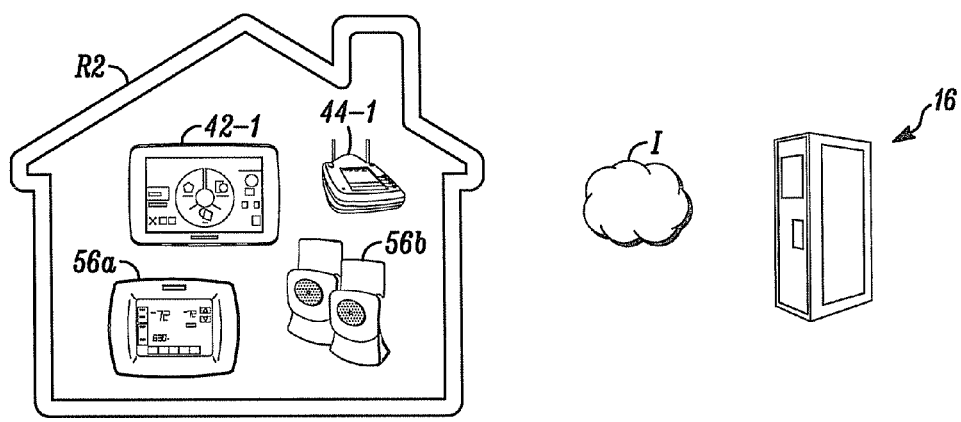
FIG. 6B illustrates another view of the system of FIG. 6A.

FIG. 6B illustrates the system 50 in connection with monitoring events in a region R2. Device 42 has been implemented as device 42-1, for example the previously noted TUXEDO brand product, in conjunction with a local alarm monitoring system, indicated at 56*a*, and associated sensors, as at 56*b*.

Systems such as 50 can implement various useful methods, including using UPNP technology to automatically find all associated devices in system 50 and supervising the devices periodically to resolve port conflict within the network plus within the router and updating the associated user accounts of the DDNS server 16 with new port changes of system 50. Alternately, system 50 can automatically find and configure the network router to close a port and automatically connect to a remote DDNS server, such as server 16, to remove IP devices from an existing DDNS user account.

Additionally, a remote administrator or machine can remotely connect to an IP intelligent device capable of using UPNP technology to automatically find and configure a network router to open a port and automatically connect to a remote DDNS server, such as server 16, to add an IP device to an existing DDNS user account. Alternately, the administrator or machine can remote connect to an IP intelligent device capable of using UPNP technology to automatically find and configure the network router to close a port and automatically connect to a remote DDNS server to remove the IP device from an existing DDNS user account.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims.

Further, logic flows depicted in the figures do not require the particular order shown, or sequential order, to achieve desirable results. Other steps may be provided, or steps may be eliminated, from the described flows, and other components may be add to, or removed from the described embodiments.

The invention claimed is:

1. A method of establishing a user account or adding a new device to the user account comprising:
providing a first internet protocol ("IP") device, a universal plug and play ("UPNP") capable router, and a remote dynamic domain name server ("DDNS") server;
communicating, using the first IP device, with the UPNP capable router;
the first IP device opening a first unused port of the UPNP capable router;
establishing a first IP address for the UPNP capable router;
providing a user account data packet and forwarding the user account data packet, using the UPNP capable router, to the remote DDNS server, wherein the user account data packet includes the first IP address for the UPNP capable router, a MAC address for the first IP device, a user name, and a password;
the remote DDNS server using the user account data packet, the first IP address for the UPNP capable router, the MAC address for the first IP device, the user name, and the password to establish the user account with new account and new login information for a user at the remote DDNS server and establishing a URL for the first IP address enabling the user to access the first IP device from a displaced location; and
the first IP device, using plug and play technology, automatically determining a presence of a second IP device, supervising the second IP device to resolve port conflicts within a network and within the UPNP capable router, updating the user account at the DDNS server with new port information, and configuring the UPNP capable router to close a selected port and automatically connect to the DDNS server to remove one or more other IP devices from the user account at the DDNS server.

2. The method as in claim 1 further comprising carrying out an authentication process at least at the remote DDNS server.

3. The method as in claim 1 further comprising:
enabling the first IP device using UPNP executable instructions to automatically find the second IP device;
configuring the UPNP capable router to open a second unused port;
connecting to the remote DDNS server to add the second IP device to the user account for the user; and
providing a request that the second IP device be associated with the first IP address.

4. The method as in claim 1 wherein the remote DDNS server, responsive to a received request, provides a previously assigned IP address.

5. The method as in claim 4 further comprising providing a domain name to the remote DDNS server.

6. The method as in claim 5 further comprising providing user identification information to the remote DDNS server.

7. The method as in claim 6 further comprising:
forwarding an account number from the remote DDNS server to the UPNP capable router; and
a displaced interrogation device communicating with the remote DDNS server to obtain the first IP address for the UPNP capable router and subsequently communicating with the first IP device via the UPNP capable router.

8. The method as in claim 1 further comprising providing a domain name associated with the first IP device.

9. An apparatus comprising:
a dynamic domain name server ("DDNS") server;
a first server based product; and
a universal plug and play capable router that communicates with both the DDNS server and the first server based product,
wherein the first server based product initiates a registration process with the DDNS server via the universal plug and play capable router,
wherein the first server based product configures the universal plug and play capable router to open an unused port and automatically connect to the DDNS server so that the first server based product transmits a user account data packet to the DDNS server for use by the DDNS server in opening a new user account having new account and login information,
wherein the user account data packet includes a first IP address for the universal plug and play capable router, a MAC address for the first server based product, a user name, and a password, and
wherein the first server based product, using plug and play technology, automatically determines a presence of a second server based product, supervises the second server based product to resolve port conflicts within a network and within the universal plug and play capable router, updates the new user account at the DDNS server with new port information, and configures the universal plug and play capable router to close a selected port and automatically connect to the DDNS server to remove one or more IP devices from the new user account at the DDNS server.

10. The apparatus as in claim 9 wherein the first server based product forwards a domain name to the DDNS server.

11. The apparatus as in claim 9 wherein the first server based product includes circuitry to interrogate the universal plug and play capable router to establish a number of the unused port.

12. The apparatus as in claim 9 wherein each of the first server based product and the DDNS server includes instructions to carry out a matching authentication process.

13. The apparatus as in claim 9 wherein a displaced interrogation device communicates with the DDNS server to obtain a domain name address for the first server based product and subsequently communicates with the first server based product.

14. The apparatus as in claim 9 further comprising circuitry to establish a second IP address for the second server based product and to add the second IP address for the second server based product to the new user account at the DDNS server.

15. A method comprising:
providing a first server based internet protocol ("IP") product;
providing a plug and play router associated with the first server based IP product;
providing a second server based IP product; and
providing a dynamic domain name server ("DDNS") server,
wherein the first server based IP product transmits a user account data packet to the DDNS server via the plug and play router for use by the DDNS server in establishing a user account having new account information and login information at the DDNS server,
wherein the user account data packet includes an IP address for the plug and play router, a MAC address for the first server based IP product, a user name, and a password,
wherein the first server based IP product, using plug and play technology, automatically finds and configures the plug and play router to open an unused port and automatically communicates with the DDNS server, and
wherein the first server based IP product, using the plug and play technology, automatically determines a presence of the second server based IP product, supervises the second server based IP product to resolve port conflicts within a network and within the plug and play router, updates the user account at the DDNS server with new port information, and configures the plug and play router to close a selected port and automatically connect to the DDNS server to remove one or more other IP devices from the user account at the DDNS server.

16. A method comprising:
providing a first server based internet protocol ("IP") product;
providing a plug and play router associated with the first server based IP product; and
providing a dynamic domain name server ("DDNS") server,
wherein the first server based IP product communicates a user account data packet to the DDNS server via the plug and play router to establish a user account having new account information and login information at the DDNS server,
wherein the user account data packet includes an IP address for the plug and play router, a MAC address for the first server based IP product, a user name, and a password,
wherein one of an administrator or a displaced electronic unit communicates with the first server based IP product from a displaced location,
wherein the first server based IP product, using plug and play technology, automatically finds and configures the plug and play router to open an unused port and automatically communicate with the DDNS server to add a second server based IP product to the user account at the DDNS server, and
wherein the first server based IP product, using the plug and play technology, automatically determines a presence of the second server based IP product, supervises the second server based IP product to resolve port conflicts within a network and within the plug and play router, updates the user account at the DDNS server with new port information, and finds and configures the plug and play router to close a selected port and automatically communicate with the DDNS server to remove one or more other IP enabled devices from the user account at the DDNS server.

\* \* \* \* \*